Figure 1:
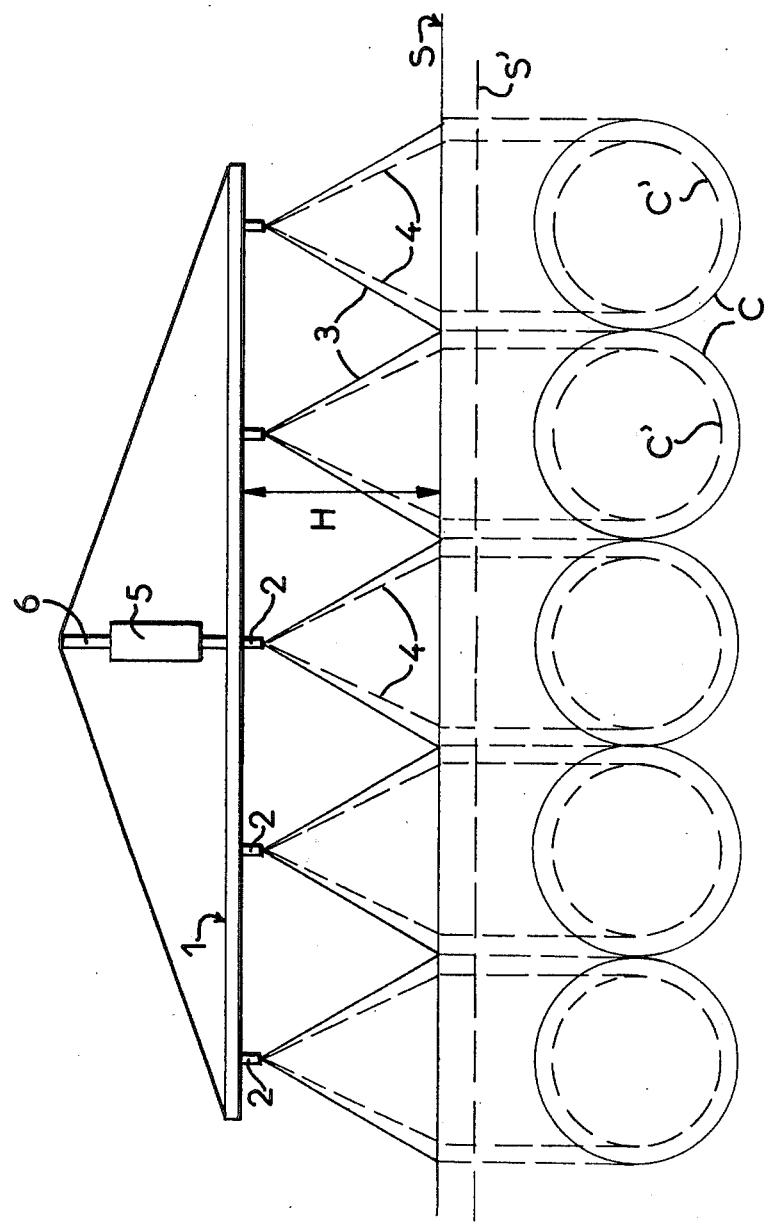

United States Patent [19]

Lestradet

[11] 4,186,878

[45] Feb. 5, 1980

[54] SYSTEM FOR POSITIONING THE SPRAY BOOM OF AGRICULTURAL SPRAYERS

[76] Inventor: Maurice C. J. Lestradet, 291 rue du Maréchal de Lattre de Tassigny, 51230 Fere Champenoise, France

[21] Appl. No.: 954,778

[22] Filed: Oct. 26, 1978

[30] Foreign Application Priority Data

Jul. 21, 1978 [FR] France .................................. 78 21717

[51] Int. Cl.² .............................................. B05B 15/08
[52] U.S. Cl. ..................................... 239/160; 239/176
[58] Field of Search ................... 239/97, 98, 160, 161, 239/164, 169, 176; 118/7, 305, 315; 404/111

[56] References Cited

U.S. PATENT DOCUMENTS

| 2,699,967 | 1/1955 | Edinborough et al. | 239/164 |
| 3,034,727 | 5/1962 | Paulson | 239/169 |
| 3,362,643 | 1/1968 | Larson et al. | 239/169 |
| 3,874,593 | 4/1975 | Wilt | 239/169 |

Primary Examiner—Robert W. Saifer

[57] ABSTRACT

In a sprayer, particularly an agricultural sprayer, having a boom equipped with conical jet spraying nozzles, the height of the boom above the plane of the surface to be treated is controlled in accordance with the pressure of the spray liquid in the boom by a system for the displacement of the boom perpendicularly to the plane of the surface to be treated, which system is mounted on the chassis of the sprayer, and provided with detectors for detecting the position of the boom with respect to the chassis, a comparator for comparing signals coming from the detectors with a value representing the pressure of the fluid in the boom, and a hydraulic jack connected to the comparator for operating the said displacement system in one direction or the other according to the differences detected, for the purpose of maintaining a tangent relationship between the circles or ellipses of the intersection of the conical spray jets with the plane of the said surface to be treated.

6 Claims, 3 Drawing Figures

SYSTEM FOR POSITIONING THE SPRAY BOOM OF AGRICULTURAL SPRAYERS

BACKGROUND

The present invention concerns agricultural sprayers designed for the spreading of crop treatment products, herbicides, fungicides, and particularly fertilizers in suspension.

These machines comprise one or more spray booms deployed above the soil and projecting conically shaped sprays of product against it. To this end, the boom or booms are equipped with spray nozzles aimed at the ground.

It is important during the spreading of a product to spray all of the surface under treatment without skipping and without any overlapping of sprayed areas.

Now, the spray that is applied to the soil by a nozzle strikes the ground in a pattern of circular or nearly circular elliptical shape, whose size depends on the height of the nozzle above the ground and on the pressure of the liquid being sprayed. For a given height of the spray boom above the ground, the total area sprayed will depend on the pressure of the liquid being sprayed. The greater the pressure is, the closer the cone will approach the theoretical cone defined by the design spray angle of the nozzle. On the other hand, as the pressure diminishes, the spray coverage tends to be reduced by the action of gravity.

It is also easy to understand that such variations of the area sprayed with the pressure of the liquid are amplified when wide-angle spray nozzles are used. It is evident that, if variations occur in the spray pressure, while the height of the spray nozzles above the ground remains the same, there is a danger that overlapping of the spray cones will occur, or, on the other hand, that areas of the soil will fail to be covered by the spray.

THE INVENTION

The object of the present invention is to eliminate these difficulties by proposing means for achieving an optimum spray coverage despite any variations in the pressure of the liquid being sprayed. In other words, the object of the invention is to bring it about that the circles or ellipses formed by the conical sprays on the surface of the ground will be constantly tangent with one another regardless of the pressure of the liquid being sprayed, or, at the very least, regardless of what that pressure is within a predetermined range.

For this purpose, the subject matter of the invention is a device for the automatic regulation of the height, with respect to the plane of the surface being treated, of a boom equipped with the conical spray nozzles of a spraying machine, particularly an agricultural sprayer, characterized by comprising a system for shifting the boom perpendicularly to the plane of the surface being treated, which is mounted on the chassis of the sprayer, means for detecting the position of the boom with respect to the chassis, means for comparing the signals coming from the detection means with a signal representing of said fluid pressure in the boom, and means connected to the comparison means for operating the said shifting system in the one direction or the other according to the differences detected, for the purpose of keeping a substantially tangent relationship between the circles or ellipses formed by the conical spray jets on the plane of the surface being treated.

In accordance with a first embodiment, the said means for detecting the position of the boom is constituted by a certain number of fixed detectors aligned along the course of movement of a detector actuating member affixed to the boom, these detectors being capable of transmitting a signal when the detector actuating member reaches or passes the level of the detector in question, the signals being constantly compared with the value of the boom pressure signal in the said comparison means, each signal being capable of reducing the departure from the input value by a predetermined, controllable amount.

In a second embodiment, the boom position detecting means is constituted by a transducer continuously signaling the momentary position of the boom along its course of travel, the signal put out by the transducer being sent to the comparison means.

The comparison means are means receiving, on the one hand, the input signal, and, on the other hand, the signal or signals representing the position of the boom and putting out boom movement control signals whenever the momentary difference between the compared signals exceeds a predetermined, controllable threshold.

Figure 2:
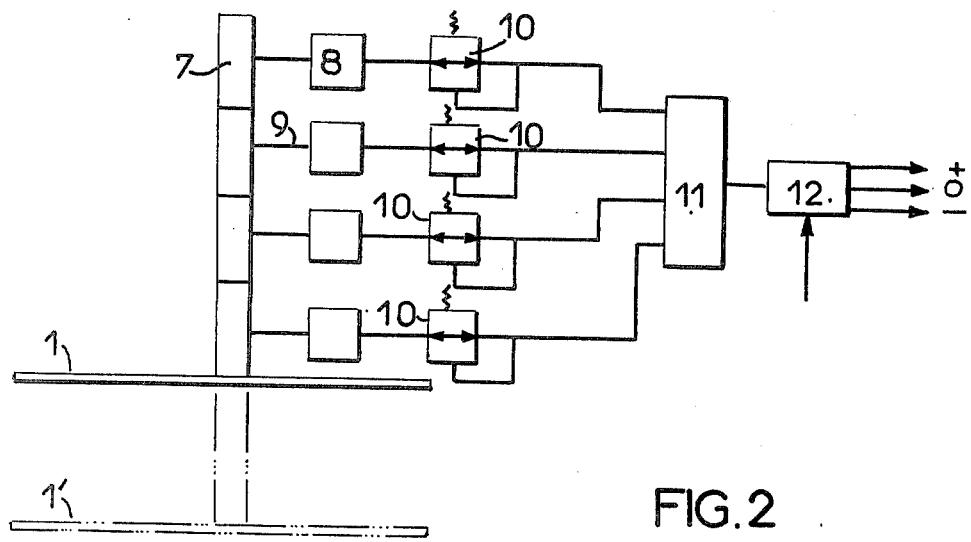
Figure 3:
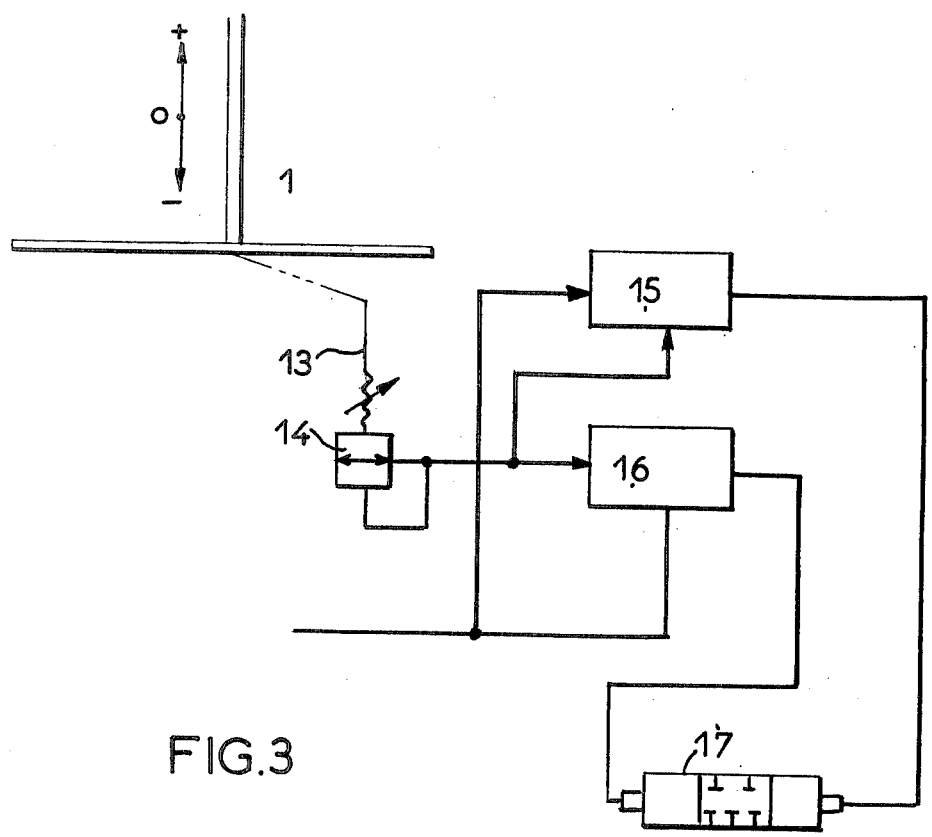

Other features and advantages will appear from the description that follows of embodiments of the apparatus of the invention, which is given only by way of example, and in conjunction with the appended drawings, wherein:

FIG. 1 represents diagrammatically a front view of a spray boom spraying a product on a surface, FIG. 2 illustrates diagrammatically a first embodiment of the apparatus of the invention, and FIG. 3 illustrates diagrammatically a second embodiment.

In FIG. 1, a spray boom of an agricultural sprayer (not shown) is indicated at 1. This boom is disposed substantially parallel with the surface S of the ground and comprises a plurality of spray nozzles 2 regularly distributed and pointing toward the ground so as to project onto the ground the conical sprays 3 of a liquid treatment product, for example. The conical sprays 3 are all alike, and their angle at the apex is determined by the structure of the nozzles and the pressure of the liquid within the boom 1.

It is very important to have no unsprayed areas on the ground, or excessively sprayed zones due to overlapping of the sprays 3. The height H of the boom 1 above the ground S is therefore of fundamental importance. Thus it is that, commonly, for the spreading of fertilizer suspensions, for example, a liquid pressure in boom 1 of 2.250 bars is used, and the ideal height H is 1.25 meters, corresponding to the spray configuration 3 represented in solid lines in FIG. 1. In this FIG. 1, the extreme generatrices of sprays 3 meet precisely at the ground level S. In other words, the circles (or nearly circular ellipses) at which the conical sprays 3 contact the ground level S are precisely tangent to one another. These circles are represented rotated at 90° at C in FIG. 1.

It is evident that, if the pressure of the liquid in the boom 1 decreases, the sprays 3 will tend to change shape and close up due to the action of gravity, so that spray configurations such as those illustrated in broken lines at 4 in FIG. 1 will be produced. The meeting of these sprays 4 with the surface S gives circles C' which are no longer tangent at all with one another, and the projected outer generatrices of the jets 4 would intersect one another at a level S' below the ground level S.

Therefore, to compensate for the reduction of the pressure and regain tangent circles, it is necessary to make surfaces S and S' to coincide by increasing the height H of the boom above the soil S. Conversely, if the pressure of the liquid in the boom increases, the sprays 3 will tend to expand and therefore to meet one another before reaching the ground. The theoretical limit of the expansion of the sprays is based on the structure of the nozzles (spray angle), but this limit is never actually reached in practice on account of the action of gravity. It is therefore necessary to decrease the height H of the boom in order to restore the tangency of the circles C.

For this purpose, in accordance with the invention, a system is provided for regulating the height H in accordance with the variations of the liquid pressure in the boom. The boom 1 can be shifted on the sprayer chassis by means of a double-acting hydraulic jack, represented diagrammatically at 5 in FIG. 1, for example. The body of the jack 5 is fixed to the chassis and the piston rod 6 of the jack is affixed to the boom 1. The jack 5 makes it possible to raise or lower the boom 1 with respect to the ground S under the control of an appropriate device acting on the basis of the variations in the pressure of the liquid in the boom 1.

FIG. 2 illustrates a first embodiment of such a device for the control of the jack 5. The spray boom 1 is provided with a cam 7 affixed to it and movable vertically with it. The cam 7 is represented by a rectangle which, in its upward travel, can meet a series of successive limit switches 8 stacked vertically and affixed to the chassis of the sprayer.

When the boom is in its bottom end position 1', none of the feelers 9 of the limit switches 8 is engaged by cam 7. As the boom 1 rises, the feelers 9 will be engaged successively. In the uppermost position of ramp 1, all of the feelers 9 are engaged, as represented in FIG. 2. Each limit switch 8 is connected through a presetting device 10 to an adder circuit 11 for totaling the various data, whose output is connected to a comparator 12.

The comparator 12 likewise receives at its input a signal representing the pressure of the liquid in the spray boom. The instruction signal is given, for example, by a transducer (not shown) whose purpose is to convert the liquid pressure to an inversely proportional electrical signal. The comparator 12 has three outputs connected to a solenoid valve (not shown) controlling the jack 5 for raising and lowering the spray boom. One of the outputs (+) controls the raising of the boom 1, and another output (−) controls the lowering of the boom, while the third (0) holds the boom in position.

The operation of this system is as follows. The adder circuit 11 constantly delivers to the comparator 12 a signal whose amplitude is proportional to the number of limit switches actuated by cam 7, that is to say, proportional to the height of the boom 1 above the ground, with, however, a slight uncertainty of position due to the space separating the feelers 9. To reduce this uncertainty, it will suffice to provide a sufficient number of limit switches.

When the boom is in the lowered position (1'), the output signal of circuit 11 is at a minimum, but when it is in the raised position it is maximum. Between these two extreme levels, the output signal of circuit 11 assumes different values step by step according to the height of the cam 7 with respect to the fixed feelers 9. The signal with which the output signal of circuit 11 is to be compared will have a certain level which is inversely proportional to the pressure of the liquid in the boom.

At the beginning of the spraying operation, a manual adjustment is made of the known ideal height of the boom 1, on the basis of the pressure at this time of the liquid to be sprayed. Once this positioning of the boom has been set, either the individual level of the signals delivered by the limit switches 8 is set by means of their associated presetting circuits 10, or the level of the liquid pressure signal is adjusted, by means of a potentiometer, for example, so as to obtain the signal 0 (holding the boom in position) at the output of the comparator 12, corresponding to a difference between the inputs of the comparator 12 equal to zero or at least lower than a predetermined adjustable threshold.

If, during the spraying operation, the pressure of the liquid should diminish, for example, the amplitude of the pressure signal will increase. The comparator 12 will detect a difference, producing a signal + at the output and commanding the raising of the boom 1. During the raising of the boom, one or more additional feelers 9 will be engaged by the cam 7, which will increase the level of the signal applied to the comparator 12. When the level of the pressure signal is reached, or when the difference becomes less than the preset threshold, the + output is deactivated and the 0 output is activated, holding the boom 1 at the height that has been reached. This new position of the boom 1 will correspond to a renewed tangency of the circles C, provided, of course, that first the system has been calibrated, that the presetting circuits 10 have been selected and adjusted such that the various positions which can be occupied by the boom 1 correspond to such liquid pressures that the said circles C are indeed substantially tangent to one another. If, however, the liquid pressure should increase, the pressure signal voltage would decrease. The comparator will detect a difference in the opposite direction from that of the previous case and will deliver to the output (−) a signal commanding the lowering of the boom until the output signal of circuit 11 becomes equal to the pressure signal.

The pressure signal applied to the comparator 12 can also be directly proportional to the liquid pressure rather than inversely proportional. Since, however, the signal put out by circuit 11 has to develop in the same direction as the pressure signal, it is necessary, for example, for the boom to be raised in response to a lowering of pressure, and actuate the different limit switches so as to decrease the voltage of the signal put out by circuit 11. The arrangement of cam 7 must then be the inverse of that shown in FIG. 2, that is, when the boom is in the raised position, all of the feelers 9 will be disengaged from the cam, and in the lowered position they will all be engaged, unless the arrangement of FIG. 2 is retained and provision is made for the limit switches to open when they are engaged instead of closing.

FIG. 3 illustrates another embodiment, in which the detection of the change of height of the boom 1 is accomplished continuously rather than in steps. To this end, an analog movement is converted into an analog signal whose level at any moment corresponds to a particular height of the boom. Such a system is, of course, more precise than a stepwise method of detection as in the case of the feelers 9 of FIG. 2.

In FIG. 3, the boom 1 is connected mechanically by a linkage system symbolized at 13 to a transducer 14 delivering at its output an analog signal whose voltage is proportional to the elevation of boom 1. When the boom 1 rises, the signal voltage put out by the transducer 14 decreases and when the boom descends the signal voltage increases. This output signal of transducer 14 is delivered to two comparators 15 and 16, both of which receive the signal representing the pressure of the liquid in the boom, this signal being directly proportional to that pressure. The two comparators 15 and 16 control a hydraulic control valve 17 controlling the hydraulic jack 5. One of the comparators (15) is designed to detect a negative difference between the pressure signal and the signal indicating the height of the boom 1 and to cause the boom to lower, while the other comparator (16) detects a positive difference and commands the raising of the boom.

It is to be noted that these two comparators could be replaced by a single comparator of the type represented in FIG. 2.

The operation of the system of FIG. 3 is similar to that of the preceding system.

It is, of course, necessary to design the system and to match the curve of liquid pressure variations to the curve of the amplitude of the signal put out by the transducer, so that to each liquid pressure level there will correspond a position of the spray boom at which the circles C will be tangent to one another. If this is done, the system will operate automatically in a continuous manner. Upon each variation of the liquid pressure in one direction or the other, one or the other of detectors 15 and 16 will detect a difference and act on the hydraulic control valve 17 to shift the boom so as to reduce the difference and bring it back either to a zero value or to a value lower than a predetermined, controllable threshold below which neither of the comparators will deliver a signal to the hydraulic control valve, and in this case the boom will remain stationary.

In both of the embodiments shown in FIGS. 2 and 3, the spray boom lowering and raising means is a hydraulic or pneumatic cylinder operated by means of a hydraulic or pneumatic control valve, but it can also be an electric motor driving an endless screw or rack, or other such means.

Likewise, the spray boom height detecting systems can be constituted by equivalent mechanical, pneumatic, hydraulic, electrical, photoelectrical or electronic means.

The various signals delivered to the comparator or comparators can be numerical signals, the comparators being, of course, adapted for these signals.

Lastly, the invention is applied generally to the projection or spraying of any liquid onto any surface whenever it is desired to prevent the sprays from overlapping or from leaving unsprayed areas between them.

I claim:

1. Device for the automatic regulation of the height with respect to the plane of the surface to be treated, of a boom (1) equipped with conical jet spraying nozzles of a sprayer, particularly an agricultural sprayer, in accordance with the pressure in the boom of the fluid to be sprayed, characterized in that it comprises a system for the translatory displacement of the boom perpendicularly to the plane of the surface to be treated, mounted on the chassis of the sprayer, means (7 to 9) for detecting the position of the boom in respect to the said chassis, means (12) for comparing the signals coming from the detection means with a value representing the said fluid pressure in the boom, and means connected to the comparison means for operating the said displacement system in one direction or the other in accordance with the differences detected, for the purpose of keeping substantially tangent the circles or ellipses at which the conical spray jets intersect with the plane of the said surface to be treated.

2. Device in accordance with claim 1, characterized in that the said means for detection of the position of the boom is constituted by a certain number of fixed detectors aligned along the path of a means of operating the detectors which is affixed to the boom and capable of delivering a signal when the said means passes at the level of the detector in question, the signals being permanently compared with the said required value in the said comparison means, each signal being capable of reducing the difference with respect to the required value, by a predetermined, controllable amount.

3. Device in accordance with claim 1, characterized in that the said means of detecting the position of the boom is constituted by a transducer continuously transmitting the momentary position of the boom along its course of displacement, the signal delivered by the transducer being sent to the said means of comparison.

4. Device in accordance with any of claims 1 to 3, characterized in that the said boom displacement system is a hydraulic or pneumatic jack operated by a hydraulic or pneumatic control valve connected to the said means of comparison.

5. Device in accordance with claim 2, characterized in that the said detectors are limit switches adapted for cooperation with a cam affixed to the boom, the output signals from said switches being sent through signal level regulating circuits to an adder circuit whose output is connected to the said means of comparison.

6. Device in accordance with claim 3, characterized in that the said transducer is connected mechanically by a reduction linkage to the ramp and delivers an analog signal to two comparators, both receiving a required-value signal and operating, one in the one direction and the other in the other direction, the boom displacement system.

* * * * *